(12) United States Patent
Kito et al.

(10) Patent No.: US 11,713,366 B2
(45) Date of Patent: Aug. 1, 2023

(54) RESIN COMPOSITION FOR MODEL MATERIAL AND METHOD FOR MANUFACTURING OPTICALLY SHAPED ARTICLE

(71) Applicants: MAXELL, LTD., Kyoto (JP); MIMAKI ENGINEERING CO., LTD., Nagano (JP)

(72) Inventors: Katsuyuki Kito, Osaka (JP); Taeko Izumo, Osaka (JP); Masakatsu Okawa, Nagano (JP); Kenta Hongo, Nagano (JP)

(73) Assignee: MAXELL, LTD., Kyoto (JP)

( * ) Notice: Subject to any disclaimer, the term of this patent is extended or adjusted under 35 U.S.C. 154(b) by 894 days.

(21) Appl. No.: 16/311,578

(22) PCT Filed: Jun. 22, 2017

(86) PCT No.: PCT/JP2017/023090
§ 371 (c)(1),
(2) Date: Dec. 19, 2018

(87) PCT Pub. No.: WO2017/222025
PCT Pub. Date: Dec. 28, 2017

(65) Prior Publication Data
US 2019/0241691 A1 Aug. 8, 2019

(30) Foreign Application Priority Data
Jun. 22, 2016 (JP) .................................. 2016-123572

(51) Int. Cl.
*C08F 220/28* (2006.01)
*C08F 290/06* (2006.01)
(Continued)

(52) U.S. Cl.
CPC ........ *C08F 220/282* (2020.02); *B29C 64/112* (2017.08); *B29C 64/40* (2017.08);
(Continued)

(58) Field of Classification Search
CPC .............. C09D 11/101; B29K 2033/12; B29K 2033/08; C08F 220/28;
(Continued)

(56) References Cited

U.S. PATENT DOCUMENTS

2008/0090931 A1* 4/2008 Nagvekar ............ C09D 133/14
525/254
2011/0028586 A1* 2/2011 Kito ........................ C09D 11/38
522/63
(Continued)

FOREIGN PATENT DOCUMENTS

CN 103666102 A 3/2014
CN 105058791 A 11/2015
(Continued)

OTHER PUBLICATIONS

Osaka Organic Chemical Industry Ltd., "MEDOL-10", (NPL1). Retrieved from https://www.ooc.co.jp/en/products/chemical/monofunctional/MEDOL-10. Snapshot from Archive.com retrieved from https://web.archive.org/web/20170519181554/https://www.ooc.co.jp/en/products/chemical/monofunctional/MEDOL-10 (Year: 2017).*
(Continued)

*Primary Examiner* — Francisco W Tschen
*Assistant Examiner* — Edgaredmanuel Troche
(74) *Attorney, Agent, or Firm* — McDermott Will & Emery LLP

(57) ABSTRACT

The present invention provides a resin composition for a model material, for obtaining an optically shaped article that has flexibility and does not crack even when it is bent, and
(Continued)

a method for manufacturing optically shaped articles that are shaped using the resin composition for a model material. The present invention relates to a resin composition for a model material, comprising, based on 100 parts by weight of a whole resin composition, 20 to 90 parts by weight of a (meth)acrylate monomer represented by the following formula (1) and/or a (meth)acrylate monomer represented by the following formula (2) as a monofunctional monomer (A), and 5 parts by weight or more of a polyfunctional oligomer as an oligomer (B), and further comprises no or 15 parts by weight or less, based on 100 parts by weight of the whole resin composition, of polyfunctional monomer (C),

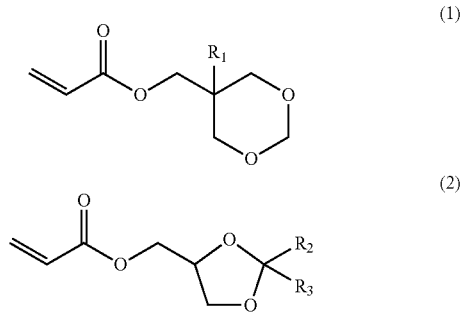

wherein $R_1$, $R_2$ and $R_3$ each independently represent a hydrogen atom or a linear or branched alkyl group having 1 to 3 carbon atoms.

6 Claims, 1 Drawing Sheet

(51) Int. Cl.
| | | |
|---|---|---|
| *C08F 2/46* | (2006.01) | |
| *B33Y 10/00* | (2015.01) | |
| *B29C 64/112* | (2017.01) | |
| *B29C 64/40* | (2017.01) | |
| *C09D 11/101* | (2014.01) | |
| *C09D 11/107* | (2014.01) | |
| *C09D 11/30* | (2014.01) | |
| *B29C 67/00* | (2017.01) | |
| *B29K 33/00* | (2006.01) | |

(52) U.S. Cl.
CPC .............. *B29C 67/00* (2013.01); *B33Y 10/00* (2014.12); *C08F 2/46* (2013.01); *C08F 290/06* (2013.01); *C09D 11/101* (2013.01); *C09D 11/107* (2013.01); *C09D 11/30* (2013.01); *B29K 2033/08* (2013.01)

(58) Field of Classification Search
CPC ........ C08F 220/281–283; C08F 220/285–288; C08F 2/46; C08F 2/48; B33Y 70/00; B33Y 70/10; B29C 64/40; B29C 64/112; C09B 29/24
USPC ...................... 526/318, 318.1, 0.41, 0.42, 72
See application file for complete search history.

(56) References Cited

U.S. PATENT DOCUMENTS

| | | | |
|---|---|---|---|
| 2013/0234370 A1* | 9/2013 | Suzuki ................ | C09D 11/101 264/401 |
| 2016/0046777 A1 | 2/2016 | Kawamura | |

FOREIGN PATENT DOCUMENTS

| | | | | |
|---|---|---|---|---|
| CN | 105073415 A | | 11/2015 | |
| EP | 2 705 953 A1 | | 3/2014 | |
| JP | 2005-283840 A | | 10/2005 | |
| JP | 2005283840 A | * | 10/2005 | |
| JP | 2012-111226 A | | 6/2012 | |
| JP | 2012111226 A | * | 6/2012 | ........... B29C 64/112 |
| JP | 2014-047305 A | | 3/2014 | |
| WO | 2015/049873 A1 | | 4/2015 | |
| WO | WO-2015049873 A1 | * | 4/2015 | ........... C09D 11/101 |

OTHER PUBLICATIONS

English Machine Translation of JP-2005283840A; Maeda, Yukio (Year: 2005).*
Machine English Translation of Nakamura Masaki (WO-2015049873-A1) (Year: 2015).*
Machine English Translation of Suzuki, Hideyuki et al. (JP-2012111226-A). (Year: 2012).*
NPL1 "PubChem (5-Ethyl-1,3-dioxan-5-yl)methyl acrylate (Compound)" non patent literature, retrieved from https://pubchem.ncbi.nlm.nih.gov/compound/5-Ethyl-1_3-dioxan-5-yl_methyl-acrylate (Year: 2004).*
Extended European Search Report issued in corresponding European Patent Application No. 17815491.0-1102, dated Feb. 18, 2020.
Chinese Office Action issued in corresponding Chinese Patent Application No. 201780039608.7, dated Jul. 2, 2020, with English translation.
International Search Report issued in corresponding International Patent Application No. PCT/JP2017023090, dated Sep. 19, 2017, with English Translation.
International Preliminary Report on Patentability issued in corresponding International Patent Application No. PCT/JP2017/023090, dated Dec. 25, 2018, with English Translation.
Chinese Office Action issued in corresponding Chinese Patent Application No. 201780039608.7, dated Mar. 31, 2021, with English translation.

* cited by examiner

RESIN COMPOSITION FOR MODEL MATERIAL AND METHOD FOR MANUFACTURING OPTICALLY SHAPED ARTICLE

TECHNICAL FIELD

This application the U.S. National Phase under 35 U.S.C. 371 of International Application No. PCT/JP2017/023090, filed on Jun. 22, 2017, which claims the benefit of Japanese Application No, 2016-123572, filed on Jun. 22, 2016, the entire contents of each are hereby incorporated by reference.

The present invention relates to a resin composition for a model material, which is used for shaping a model material by an inkjet optical shaping method, and a method for manufacturing optically shaped articles that are shaped using the resin composition for a model material.

BACKGROUND ART

Conventionally, as a method for making a stereoscopically shaped product, a shaping method using a photocurable resin composition which cures by irradiating ultraviolet rays or the like has widely been known. Specifically, in such a shaping method, a cured layer having a predetermined shape is formed by irradiating the photocurable resin composition with ultraviolet rays or the like to cure it. Thereafter, a new cured layer is formed by further feeding the photocurable resin composition on the cured layer to cure it. By repeatedly performing the step as described above, a stereoscopically shaped product is made.

Among the shaping methods, in recent years, an optical shaping method by an inkjet system of discharging a photocurable resin composition from a nozzle, and irradiating ultraviolet rays or the like immediately after that to cure it, thereby, forming a cured layer having a predetermined shape (hereinafter, referred to as inkjet optical shaping method) has been reported (Patent Document 1). The inkjet optical shaping method does not need installation of a large-scale resin liquid tank for storing the photocurable resin composition and a darkroom. For that reason, a shaping apparatus can be miniaturized as compared with the conventional method. The inkjet optical shaping method has been paid attention as a shaping method which is realized by a 3D printer that can freely make a stereoscopically shaped product, based on CAD (Computer Aided Design) data.

Recently, development of a photocurable resin composition by which an optically shaped article that is soft like rubber can be prepared, using the inkjet optical shaping method is being advanced. For example, Patent Document 2 discloses a photocurable resin composition containing a monofunctional monomer and a polyfunctional monomer, in which at least one of the monofunctional monomer or the polyfunctional monomer has a hydroxyl group or an amino group, and a total molar fraction of the hydroxyl group and the amino group in a total amount of the monofunctional monomer and the polyfunctional monomer is 5 to 30%. By curing the photocurable resin composition, an optically shaped article having elongation and elasticity like those of rubber can be prepared.

PRIOR ART DOCUMENTS

Patent Documents

Patent Document 1: JP-A-2012-111226
Patent Document 2: WO 2015/049873

SUMMARY OF THE INVENTION

Problems to be Solved by the Invention

However, the optically shaped article having flexibility like that of rubber, which is shaped using the conventional photocurable resin composition, has a problem that the article cracks when it is bent to some extent.

The present invention was made in view of the above-mentioned present situation, and an object thereof is to provide a resin composition for a model material, for obtaining an optically shaped article that has flexibility, and does not crack even when it is bent, and a method for manufacturing optically shaped articles that are shaped using the resin composition for a model material.

Solutions to the Problems

The present inventors variously made studies on the above-mentioned problem, and found out that when a resin composition for a model material contains a predetermined (meth)acrylate monomer as a monofunctional monomer and a polyfunctional oligomer as an oligomer and their contents are in predetermined ranges, an optically shaped article that is obtained by photocuring the composition has flexibility and does not crack even when it is bent.

The present invention was made based on the above-mentioned finding, and the gist thereof is as follows:

[1] A resin composition for a model material, which is used for shaping a model material by an inkjet optical shaping method and comprises a monofunctional monomer (A) and an oligomer (B) as photocurable components, wherein the resin composition comprises, based on 100 parts by weight of a whole resin composition, 20 to 90 parts by weight of a (meth)acrylate monomer represented by the following formula (1) and/or a (meth)acrylate monomer represented by the following formula (2) as the (A) component, and 5 parts by weight or more of a poly functional oligomer as the (B) component, and further comprises no or 15 parts by weight or less, based on 100 parts by weight of the whole resin composition, of polyfunctional monomer (C) as a photocurable component,

[Chemical Formula 1]

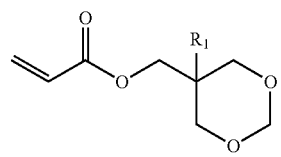

(1)

[Chemical Formula 2]

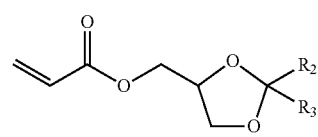

(2)

wherein $R_1$, $R_2$ and $R_3$ each independently represent a hydrogen atom or a linear or branched alkyl group having 1 to 3 carbon atoms.

The resin composition for a model material comprises 20 to 90 parts by weight of the (meth)acrylate monomer represented by the formula (1) and/or the (meth)acrylate monomer represented by the formula (2) as a monofunctional monomer (A). The (meth)acrylate monomers represented by the formula (1) and the formula (2) improve the flexibility of a cured product. When a content of the (meth)acrylate monomer represented by the formula (1) and/or the (meth)acrylate monomer represented by the formula (2) is less than 20 parts by weight, an optically shaped article obtained by photocuring the resin composition for a model material becomes easy to crack when it is bent. When manufacturing an optically shaped article using the resin composition for a model material and the resin composition for a support material, bleeding readily occurs at the interface between the resin composition for a model material and the resin composition for a support material. On the other hand, if the content of the (meth)acrylate monomer represented by the formula (1) and/or the (meth)acrylate monomer represented by the formula (2) exceeds 90 parts by weight, an optically shaped article that is obtained by photocuring the resin composition for model material is deteriorated in surface curability. In addition, the viscosity of the resin composition for model material increases, so that the surface tackiness of the optically shaped article increases. As a result, the optically shaped article cannot maintain the shape thereof.

The resin composition for a model material comprises 5 parts by weight or more of a polyfunctional oligomer as an oligomer (B). The polyfunctional oligomer is a component that improves the flexibility of a cured product. When the content of the polyfunctional oligomer is less than 5 parts by weight, the flexibility of an optically shaped article is inferior and the surface tackiness cannot be suppressed.

The resin composition for a model material comprises no or 15 parts by weight or less, based on 100 parts by weight of the whole resin composition, of polyfunctional monomer (C). For this reason, the optically shaped article can suppress surface tackiness. However, if the content of the (C) component exceeds 15 parts by weight, the optically shaped article loses flexibility because three-dimensional crosslinking is increased. As a result, the optically shaped article becomes easy to crack when it is bent. Therefore, when the (C) component is contained, the content thereof is adjusted to 15 parts by weight or less.

Since an optically shaped article which is obtained by photocuring the conventional resin composition for a model material has the large content of a monomer component, it has a problem that the surface tackiness increases when one tries to enhance the flexibility. However, since the resin composition for a model material described in [1] contains an oligomer (B) superior in reactivity and curability, the surface tackiness of an optically shaped article can be suppressed.

[2] The resin composition for a model material according to [1], wherein the polyfunctional oligomer is one or more species selected from a urethane (meth)acrylate oligomer, an epoxy (meth)acrylate oligomer, and a polyester (meth)acrylate oligomer.

When the polyfunctional oligomer is one or more species selected from a urethane (meth)acrylate oligomer, an epoxy (meth)acrylate oligomer, and a polyester (meth)acrylate oligomer, an optically shaped article is more difficult to crack even when it is bent.

[3] The resin composition for a model material according to [1] or [2], wherein the (B) component has a hydroxyl group or an amino group, and a total molar fraction of the hydroxyl group and the amino group in a total amount of the photocurable component is less than 5.0%.

When the total molar fraction is less than 5.0%, the optically shaped article has flexibility and is difficult to crack even when it is bent. On the other hand, when the total molar fraction is 5.0% or more, since the cohesive force of the (B) component itself becomes higher, when the optically shaped article is bent, a crack is generated easily at a bent part to which stress is locally applied.

[4] The resin composition for a model material according to any one of [1] to [3], wherein a content of the (meth)acrylate monomer represented by the formula (1) and/or the (meth)acrylate monomer represented by the formula (2) is 25 parts by weight or more based on 100 parts by weight of the whole resin composition.

When the content of the (meth)acrylate monomer represented by the formula (1) and/or the (meth)acrylate monomer represented by the formula (2) is 25 parts by weight or more, at the time of forming an optically shaped article using the resin composition for a model material and the resin composition for a support material, bleeding is less likely to occur at the interface between the resin composition for a model material and the resin composition for a support material.

[5] A method for manufacturing optically shaped articles by an inkjet optical shaping method, the method comprising:

a step (I) of photocuring the resin composition for a model material according to any one of [1] to [4] to obtain a model material, and at the same time, photocuring a resin composition for a support material to obtain a support material; and a step (II) of removing the support material.

By using the resin composition for a model material as according to any one of [1] to [4], an optically shaped article that is difficult to crack even when it is bent can be suitably manufactured.

Effects of the Invention

According to the present invention, there can be provided a resin composition for a model material, for obtaining an optically shaped article that has flexibility and does not crack even when it is bent, and a method for manufacturing optically shaped articles that are shaped using the resin composition for a model material.

EMBODIMENTS OF THE INVENTION

Figure 1:
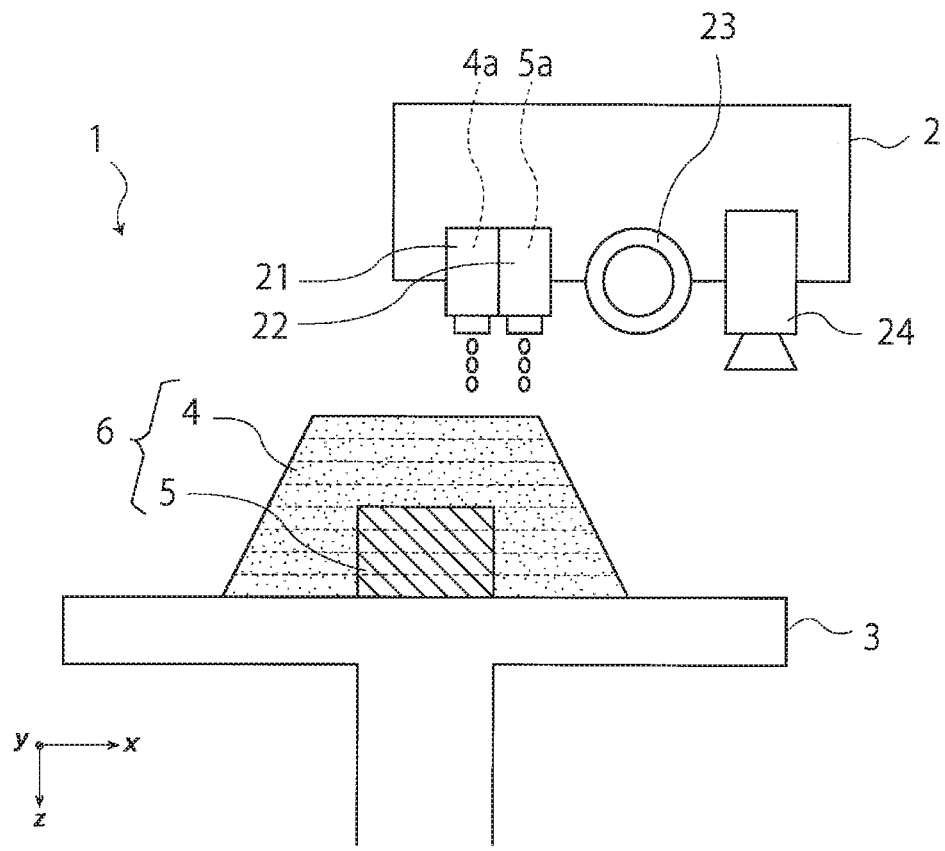
FIG. 1 is a view schematically showing a step (I) in a method for manufacturing optically shaped article; according to the present embodiment.

One embodiment of the present invention (hereinafter, also referred to as present embodiment) will be illustrated in detail below. The present invention is not limited to the following contents. In addition, in the present invention, "(meth)acrylate" is a generic name of acrylate and methacrylate, and means one or both of acrylate and methacrylate. This also applies to "(meth)acryloyl" and "(meth)acryl".

1. Resin Composition for Model Material

The resin composition for a model material according to the present embodiment is used for shaping a model material by an inkjet optical shaping method and comprises a monofunctional monomer (A) and an oligomer (B) as photocurable components, wherein the resin composition comprises, based on 100 parts by weight of a whole resin composition, 20 to 90 parts by weight of a (meth)acrylate monomer represented by the following formula (1) and/or a (meth)acrylate monomer represented by the following formula (2) as the (A) component, and 5 parts by weight or more of a polyfunctional oligomer as the (B) component, and further comprises no or 15 parts by weight or less, based on 100 parts by weight of the whole resin composition, of polyfunctional monomer (C).

[Chemical Formula 3]

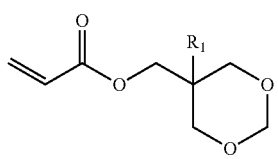

(1)

[Chemical Formula 4]

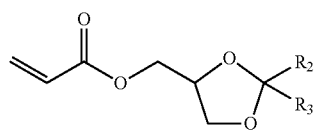

(2)

wherein $R_1$, $R_2$ and $R_3$ each independently represent a hydrogen atom or a linear or branched alkyl group having 1 to 3 carbon atoms.

<Monofunctional Monomer (A)>

A monofunctional monomer (A) is a photocurable component having such property that it is cured with an energy ray, and is necessarily contained in the resin composition for a model material. The (A) component contains 20 to 90 parts by weight, based on 100 parts by weight of the whole resin composition, of a (meth)acrylate monomer represented by the following formula (1) and/or a (meth)acrylate monomer represented by the following formula (2). The (meth)acrylate monomers represented by the formula (1) and the formula (2) are components that improve the flexibility of a cured product.

In the formulas (1) and (2), $R_1$, $R_2$ and $R_3$ each independently represent a hydrogen atom or a linear or branched alkyl group having 1 to 3 carbon atoms. Examples of the linear or branched alkyl group having 1 to 3 carbon atoms include a methyl group, an ethyl group, a n-propyl group, and an isopropyl group.

Examples of the (meth)acrylate monomers represented by the general formulas (1) and (2) include cyclic trimethylolpropane formal acrylate and (2-methyl-2-ethyl-1,3-dioxolan-4-yl)methyl acrylate. These may be used alone, or two or more of them may be used in combination. From the viewpoint of being low in molecular weight and keeping the resin composition for a model material low in viscosity, preferred among these is (2-methyl-2-ethyl-1,3-dioxolan-4-yl)methyl acrylate.

Examples of the (A) component other than the (meth)acrylate monomers represented by the formulae (1) and (2) include linear or branched alkyl (meth)acrylates having 4 to 30 carbon atoms [e.g. methyl (meth)acrylate, ethyl (meth)acrylate, isobutyl (meth)acrylate, lauryl (meth)acrylate, stearyl (meth)acrylate, isostearyl (meth)acrylate, and t-butyl (meth)acrylate], alicycle-containing (meth)acrylates having 6 to 20 carbon atoms [e.g. cyclohexyl (meth)acrylate, 4-t-cyclohexyl (meth)acrylate, isobornyl (meth)acrylate, phenoxyethyl (meth)acrylate, and dicyclopentanyl (meth)acrylate], and heterocycle-containing (meth)acrylates having 5 to 20 carbon atoms [e.g. tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane, and adamantyl (meth)acrylate]. These may be used alone, or two or more of them may be used in combination.

The content of the (meth)acrylate monomer represented by the formula (1) and/or the (meth)acrylate monomer represented by the formula (2) is 20 to 90 parts by weight based on 100 parts by weight of the whole resin composition. When a content of the (meth)acrylate monomer represented by the formula (1) and/or the (meth)acrylate monomer represented by the formula (2) is less than 20 parts by weight, an optically shaped article obtained by photocuring the resin composition for a model material becomes easy to crack when it is bent. When manufacturing an optically shaped article using the resin composition for a model material and the resin composition for a support material, bleeding readily occurs at the interface between the resin composition for a model material and the resin composition for a support material. On the other hand, if the content of the (meth)acrylate monomer represented by the formula (1) and/or the (meth)acrylate monomer represented by the formula (2) exceeds 90 parts by weight, an optically shaped article that is obtained by photocuring the resin composition for a model material is deteriorated in surface curability. In addition, the viscosity of the resin composition for a model material increases, so that the surface tackiness of the optically shaped article increases. As a result, the optically shaped article cannot maintain the shape thereof. The content of the (meth)acrylate monomer represented by the formula (1) and/or the (meth)acrylate monomer represented by the formula (2) is preferably 25 parts by weight or more, and is preferably 75 parts by weight or less. In the case where two or more species of the (meth)acrylate monomer represented by the formula (1) and/or the (meth)acrylate monomer represented by the formula (2) are contained, the above-mentioned content is defined by the total of the contents of the individual (meth)acrylate monomers.

<Oligomer (B)>

The oligomer (B) is a photocurable component having such property that it is cured with an energy ray, and is necessarily contained in the resin composition for a model material. As the (B) component, 5 parts by weight or more of a polyfunctional oligomer is contained.

From the viewpoint of making the optically shaped article resistant against cracking when it is bent, the polyfunctional oligomer is preferably one or more species selected from a urethane (meth)acrylate oligomer, an epoxy (meth)acrylate oligomer, and a polyester (meth)acrylate oligomer. From the viewpoint of having a wide range of material choice and allowing choice of materials with various properties, preferred among these is a urethane (meth)acrylate oligomer.

The content of the polyfunctional oligomer is 5 parts by weight or more based on 100 parts by weight of the whole resin composition. When the content of the polyfunctional oligomer is less than 5 parts by weight, the flexibility of an optically shaped article is inferior and the surface tackiness cannot be suppressed. On the other hand, the content of the polyfunctional oligomer is preferably 30 parts by weight or less based on 100 parts by weight of the whole resin composition. When the content of the polyfunctional oligomer exceeds 30 parts by weight, it is impossible to maintain the resin composition for a model material low in viscosity in some cases. The content of the polyfunctional oligomer is preferably 10 parts by weight or more, and is preferably 20 parts by weight or less. In the case where two or more species of the polyfunctional oligomer are contained, the above-mentioned content is defined by the total of the contents of the individual polyfunctional oligomers.

The (B) component preferably has a hydroxyl group or an amino group. In addition, the hydroxyl group includes not only an alcoholic hydroxyl group, but also a carboxyl group and the like. Additionally, the amino group includes not only a normal amino group, but also an amide bond, a urea bond, a urethane bond, and the like.

In the (B) component, the total molar fraction of the hydroxyl group and the amino group in the total amount of the photocurable components is preferably less than 5.0%. When the total molar fraction is less than 5.0%, the optically shaped article has flexibility and is difficult to crack even when it is bent. On the other hand, when the total molar fraction is 5.0% or more, since the cohesive force of the (B) component itself becomes higher, when the optically shaped article is bent, a crack is generated easily at a bent part to which stress is locally applied. The total molar fraction is more preferably 4.8% or less. Additionally, from the viewpoint that the article is made difficult to crack even when it is bent, the total molar fraction is preferably 0.5% or more, and more preferably 1.0% or more.

In addition, in the present description, the "oligomer" refers to oligomer having a weight average molecular weight Mw of 1,000 to 10,000. More preferably, the oligomer refers to an oligomer in which the lower limit of the weight average molecular weight Mw exceeds 1,000. A weight average molecular weight Mw means a weight average molecular weight in terms of polystyrene which was measured by Gel Permeation Chromatography (GPC).

<Polyfunctional Monomer (C)>

A polyfunctional monomer (C) is a photocurable component having such property that it is cured with an energy ray, and may be contained in the resin composition for a model material.

Examples of the (C) component include linear or branched alkylene glycol di(meth)acrylates or alkylene glycol tri(meth)acrylates having 10 to 25 carbon atoms [e.g. tripropylene glycol di(meth)acrylate, 1,6-hexanediol di(meth)acrylate, neopentyl glycol di(meth)acrylate, 1,9-nonanediol di(meth)acrylate, 3-methyl-1,5-pentanediol di(meth)acrylate, 2-n-butyl-2-ethyl-1,3-propanediol di(meth)acrylate, and pentaerythritol tri(meth)acrylate], and alicyclic ring-containing di(meth)acrylates having 10 to 30 carbon atoms [e.g. dimethyloltricyclodecane di(meth)acrylate]. These may be used alone, or two or more of them may be used in combination. From the viewpoint of maintaining the resin composition for a model material low in viscosity and improving the curability of an optically shaped article, preferred among these is tripropylene glycol di(meth)acrylate or 1,6-hexythanediol di(meth)acrylate.

When the (C) component is contained in the resin composition for a model material, the content thereof is 15 parts by weight or less based on 100 parts by weight of the whole resin composition. For this reason, the optically shaped article can suppress surface tackiness. However, when the content of the (C) component exceeds 15 parts by weight, the optically shaped article loses flexibility because three-dimensional crosslinking is increased. As a result, the optically shaped article becomes easy to crack when it is bent. The content of the (C) component is preferably 5 parts by weight or legs. On the other hand, the content of the (C) component is preferably 2 parts by weight or more. When the content of the (C) component is less than 2 parts by weight, the surface tackiness of an optically shaped article cannot be suppressed in some cases. In addition, when two or more species of the (C) component are contained, the above-mentioned content is defined by the total of the contents of the individual species of the (C) component.

The resin composition for a model material can contain, as necessary, other additives in such a range that the effect of the present invention is not impaired. Examples of the other additives include photopolymerization initiators, preservation stabilizers, antioxidants, coloring agents, ultraviolet absorbing agents, light stabilizers, polymerization inhibitors, chain transfer agents, and fillers.

The photopolymerization initiator is not particularly limited, as long as it is a compound that promotes a radical reaction when irradiated with ultraviolet rays, near ultraviolet rays or light having a wavelength in a visible light region. Examples of the above component include benzoin compounds having 14 to 18 carbon atoms [e.g. benzoin, benzoin methyl ether, benzoin ethyl ether, benzoin propyl ether, and benzoin isobutyl ether], acetophenone compounds having 8 to 18 carbon atoms [e.g. acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxy acetophenone, 1-hydroxycyclohexyl phenyl ketone, and 2-methyl-1-[4-(methylthio)phenyl]-2-morpholinopropan-1-one], anthraquinone compounds having 14 to 19 carbon atoms [e.g. 2-ethylanthraquinone, 2-t-butylanthraquinone, 2-chloroanthraquinone, and 2-amylanthraquinone], thioxanthone compounds having 13 to 17 carbon atoms [e.g. 2,4-diethylthioxanthone, 2-isopropylthioxanthone, and 2-chlorothioxanthone], ketal compounds having 16 to 17 carbon atoms [e.g. acetophenonedimethylketal and benzyldimethylketal], benzophenone compounds having 13 to 21 carbon atoms [e.g. benzophenone, 4-benzoyl-4'-methyldiphenyl sulfide, and 4,4'-bismethylaminobenzophenone], acylphosphine oxide compounds having 22 to 28 carbon atoms [e.g. 2,4,6-trimethylbenzoyl-diphenyl-phosphine oxide, bis-(2,6-dimethoxybenzoyl)-2,4,4-trimethylpentylphosphine oxide, and bis(2,4,6-trimethylbenzoyl)-phenylphosphine oxide], and mixtures of these compounds. These may be used alone, or two or more of them may be used in combination. From the viewpoint of light resistance that an optically-shaped article obtained by photocuring the resin composition for a model material is difficult to turn yellow, preferred among these is 2,4,6-trimethylbenzoyl-diphenyl-phosphine oxide. Additionally, examples of an available acylphosphine oxide compound include DAROCURE TPO manufactured by BASF SE.

The content of the photopolymerization initiator is 3 to 15 parts by weight based on 100 parts by weight of the whole resin composition. When the content of the photopolymerization initiator is less than 3 parts by weight, an unreacted polymerization component increases, so that the curability of an optically shaped article may be insufficient in some cases. On the other hand, when the content of the photopolymerization initiator exceeds 15 parts by weight, an unreacted photopolymerization initiator remains, so that an optically shaped article may turn yellow in some cases. In addition, when two or more species of the photopolymerization initiator are contained, the above-mentioned content is defined by a total of the contents of the individual photopolymerization initiators.

The preservation stabilizer can enhance the preservation stability of the resin composition. Additionally, head clogging caused by polymerization of a polymerizable compound with the heat energy can be prevented. In order to obtain these effects, it is preferable that the content of the preservation stabilizer is 0.05 to 3.0 parts by weight based on 1.00 parts by weight of the whole resin composition.

Examples of the preservation stabilizer include hindered amine-based compounds (HALS), phenol-based antioxidants, and phosphorus-based antioxidants. Examples of the preservation stabilizer include hydroquinone, methoquinone, benzoquinone, p-methoxyphenol, hydroquinone monomethyl ether, hydroquinone monobutyl ether, TEMPO, 4-hydroxy-TEMPO, TEMPOL, Cupferron AI, IRGASTAB UV-10, IRGASTAB UV-22, FIRSTCURE ST-1 (manufactured by ALBEMARLE Corporation), t-butylcatechol, pyrogallol, TINUVIN 111 FDL, TINUVIN 144, TINUVIN 292, TINUVIN XP40, TINUVIN XP60, and TINUVIN 400 manufactured by BASF SE. These may be used alone, or two or more of them may be used in combination. In addition, when two or more species of the preservation stabilizer are contained, the above-mentioned content is defined by a total of the contents of the individual preservation stabilizers.

The resin composition for a model material according to the present embodiment can be manufactured, for example, by uniformly mixing the (A) component and the (B) component, and if necessary, the (C) component and other additives by using a mixing stirring device or the like, without particular limitation.

The thus manufactured resin composition for a model material according to the present embodiment preferably has a viscosity at 25° C. of 3 mPa·s or more and 110 mPa·s or less, more preferably 100 mPa·s or less from the viewpoint of achieving good dischargeability from an inkjet head. The measurement of the viscosity of the resin composition for a model material can be performed using an R100-type viscometer in accordance with JIS Z8803.

2. Resin Composition for Support Material

In an inkjet optical shaping method, when an optically shaped article having a complicated shape such as a hollow shape is shaped, an optically shaped article may be shaped by combining the model material and a support material in order to support the model material obtained by photocuring the resin composition for a model material according to the present embodiment. The support material is obtained by photocuring the resin composition for a support material. After the model material is made, the support material can be removed by physically peeling it, or dissolving it in an organic solvent or water.

The resin composition for a support material contains, for example, a water-soluble monofunctional ethylenically unsaturated monomer, and polyalkylene glycol containing an oxyethylene group and/or an oxypropylene group.

<Water-Soluble Monofunctional Ethylenically Unsaturated Monomer>

A water-soluble monofunctional ethylenically unsaturated monomer is a water-soluble polymerizable monomer having one ethylenic double bond in the molecule, which has such property that it is cured with an energy ray. Examples of the water-soluble monofunctional ethylenically unsaturated monomer include hydroxy group-containing (meth)acrylates having 5 to 15 carbon atoms [e.g. hydroxyethyl (meth) acrylate, hydroxypropyl (meth)acrylate, and 4-hydroxybutyl (meth)acrylate], hydroxy group-containing (meth)acrylates having Mn of 200 to 1,000 [e.g. polyethylene glycol mono (meth)acrylate, monoalkoxy(1 to 4 carbon atoms)polyethylene glycol mono(meth)acrylate, polypropylene glycol mono(meth)acrylate, monoalkoxy(1 to 4 carbon atoms) polypropylene glycol mono(meth)acrylate, and mono(meth) acrylate of PEG-PPG block polymer], (meth)acrylamide derivatives having 3 to 15 carbon atoms [e.g. (meth)acrylamide, N-methyl(meth)acrylamide, N-ethyl(meth)acrylamide, N-propyl(meth)acrylamide, N-butyl(meth)acrylamide, N,N'-dimethyl(meth)acrylamide, N,N'-diethyl(meth)acrylamide, N-hydroxyethyl(meth)acrylamide, N-hydroxypropyl (meth)acrylamide, and N-hydroxybutyl(meth)acrylamide], and (meth)acryloylmorpholine. These may be used alone, or two or more of them may be used in combination.

From the viewpoint that the curability of the resin composition for a support material is improved and a support material obtained by photocuring the resin composition for a support material is rapidly dissolved in water, the content of the water-soluble monofunctional ethylenically unsaturated monomer is preferably 20 parts by weight or more, and more preferably 25 parts by weight or more, based on 100 parts by weight of the whole resin composition. Additionally, the content is preferably 50 parts by weight or less, and more preferably 45 parts by weight or less. In addition, when two or more species of the water-soluble monofunctional ethylenically unsaturated monomer are contained, the above-mentioned content is defined by a total of the contents of the individual water-soluble monofunctional ethylenically unsaturated monomers.

<Polyalkylene Glycol Containing Oxyethylene Group and/or Oxypropylene Group>

Polyalkylene glycol containing an oxyethylene group and/or an oxypropylene group is such that at least ethylene oxide and/or propylene oxide are (is) added to an active hydrogen compound. Examples of the polyalkylene glycol include polyethylene glycol and polypropylene glycol. These may be used alone, or two or more of them may be used in combination. Examples of the active hydrogen compound include monohydric to tetrahydric alcohols and amine compounds. Among these, a dihydric alcohol or water is preferable.

From the viewpoint of increasing the solubility in water of a support material obtained by photocuring the resin composition for a support material, the content of the polyalkylene glycol is preferably 20 parts by weight or more, and more preferably 25 parts by weight or more, based on 100 parts by weight of the whole resin composition. Additionally, the content is preferably 49 parts by weight or less, and more preferably 45 parts by weight or less. In addition, two or more species of the polyalkylene glycol are contained, the above-mentioned content s defined by a total of the contents of the individual polyalkylene glycols.

The number average molecular weight Mn of the polyalkylene glycol is preferably 100 to 5,000. When Mn of the polyalkylene glycol is within the above range, the polyalkylene glycol is compatibilized with the polyalkylene glycol before photocuring, and is not compatibilized with the polyalkylene glycol after photocuring. As a result, self-standing of a support material which is obtained by photocuring the resin composition for a support material can be enhanced, and the solubility of the support material in water can be enhanced. Mn of the polyalkylene glycol is more preferably 200 to 3,000, and further preferably 400 to 2,000.

The resin composition for a support material can contain other additives, as necessary, in such a range that the effect of the present invention is not impaired. Examples of the other additives include photocuring agents, water-soluble organic solvents, antioxidants, coloring agents, pigment dispersants, preservation stabilizers, ultraviolet absorbing agents, light stabilizers, polymerization inhibitors, chain transfer agents, and fillers.

A method for manufacturing the resin composition for a support material is not particularly limited. For example, the resin composition can be manufactured by uniformly mixing the water-soluble nonfunctional ethylenically unsaturated monomer, the polyalkylene glycol, and as necessary, other additives using a mixing stirring device or the like.

From the viewpoint of achieving good dischargeability from an inkjet head, the thus manufactured resin composition for a support material has preferably a viscosity at 25° C. of 100 mPa·s or less. The measurement of the viscosity of the resin composition for a support material can be performed using an R100-type viscometer in accordance with JIS Z8803.

3. Optically Shaped Article and Method for Manufacturing Thereof

An optically shaped article is manufactured via a step (I) of photocuring the resin composition for a model material according to the present embodiment to obtain a model material and, at the same time, photocuring the resin composition for a support material to obtain a support material, by an inkjet optical shaping method, and a step (II) of removing the support material. The step (I) and the step (II) are not particularly limited, but are performed, for example, by the following methods.

<Step (I)>

FIG. 1 is a view schematically showing a step (I) in the method for manufacturing an optically shaped article of the present embodiment. As shown in FIG. 1, a three-dimensional shaping apparatus 1 includes an inkjet head module 2 and a shaping table 3. The inkjet head module 2 has an inkjet head for a model material 21 filled with a resin composition for a model material 4a, an inkjet head for a support material 22 filled with a resin composition for a support material 5a, a roller 23, and a light source 24.

First, the inkjet head module 2 is made to perform scanning in an X direction and a Y direction relatively with respect to the shaping table 3 in FIG. 1, and at the same time, the resin composition for a model material 4a is discharged from the inkjet head for a model material 21, and the resin composition for a support material is discharged from the inkjet head for a support material 22, and thereby, a resin composition layer comprising the resin composition for a model material and the resin composition for a support material 5a is formed. And, in order to smooth an upper surface of the resin composition layer, a roller 23 is used to remove the surplus resin composition for a model material and resin composition for a support material. These resin compositions are irradiated with light using the light source 24, and thereby, a cured layer comprising a model material 4 and a support material 5 is formed on the shaping table 3.

Then, the shaping table 3 is lowered in a Z direction in FIG. 1 by a thickness of the cured layer. Thereafter, by the same method as that described above, a cured layer comprising a model material 4 and a support material 5 is further formed on the cured layer. By performing these steps repeatedly, a cured product 6 comprising the model material 4 and the support material 5 is made.

Examples of light which cures the resin composition include far infrared rays, infrared rays, visible rays, near ultraviolet rays, and ultraviolet rays. From a viewpoint of easiness and efficiency of curing work, preferred among these are near ultraviolet rays or ultraviolet rays.

Examples of the light source 24 include a lamp system and an LED system. From the viewpoint of being possible to reduce the size of facility and requiring small power consumption, preferred among these is an LED system.

<Step (II)>

Figure 2:
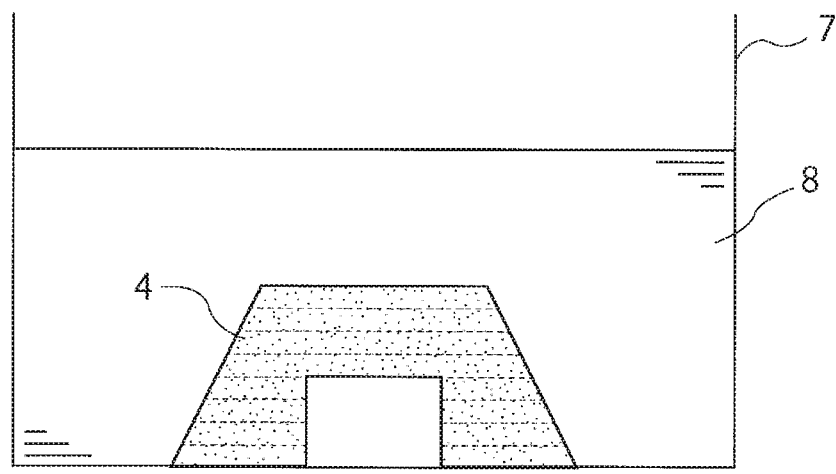
FIG. 2 is a view schematically showing a step (II) in a method for manufacturing optically shaped articles according to the present embodiment.

FIG. 2 is a view schematically showing a step (II) in the method for manufacturing an optically shaped article of the present embodiment. The cured product 6 comprising the model material 4 and the support material 5, which was prepared in the step (I), is immersed in a solvent 8 contained in a container 7. Thereby, the support material 5 can be dissolved in the solvent 8 and removed as shown in FIG. 2.

Examples of the solvent 8 which dissolves the support material include ion-exchanged water, distilled water, tap water, and well water. Among these, ion-exchanged water is preferred from the viewpoint of containing impurities in a relatively small content and being available at a low price.

The optically shaped article obtained via the process described above is obtained by photocuring a resin composition for a model material according to the present embodiment. Therefore, the optically shaped article has flexibility and does not break even when it is bent.

Examples which disclose the present embodiment more specifically will be shown below. The present invention is not limited to only these examples.

EXAMPLES (Production of Resin Composition for Model Material)

According to the formulation shown in Table 1, (A) to (C) components and a photopolymerization initiator were uniformly mixed by using a mixing stirring device to produce the resin compositions for a model material of Examples 1 to 14 and Comparative Examples 1 to 5. Using these resin compositions for a model material, the following assessment was performed.

TABLE 1

| | | | | Example 1 | Example 2 | Example 3 | Example 4 | Example 5 | Example 6 | Example 7 |
|---|---|---|---|---|---|---|---|---|---|---|
| Formulation (parts by weight) | (A) Monofunctional Monomer | (Meth)acrylate monomer of formula (1) or (2) | V#200 | 75 | — | 35 | — | 35 | — | 65 |
| | | | MEDOL-10 | — | 75 | — | 35 | — | 20 | — |
| | | Others | SR420 | — | — | 40 | 40 | — | 55 | — |
| | | | SR217 | — | — | — | — | 40 | — | — |
| | | | SR440 | — | — | — | — | — | — | — |
| | (B) | Oligomer | Ebe230 | 20 | 20 | 20 | 20 | 20 | 20 | 20 |
| | | | CN966J75 | — | — | — | — | — | — | — |
| | (C) | Polyfunctional monomer | TPGDA | — | — | — | — | — | — | 10 |
| | | Photopolymerization Initiator | TPO | 5 | 5 | 5 | 5 | 5 | 5 | 5 |

TABLE 1-continued

| | | | | Example 1 | Example 2 | Example 3 | Example 4 | Example 5 | Example 6 | Example 7 |
|---|---|---|---|---|---|---|---|---|---|---|
| Total molar fraction (%) of hydroxyl groups and amino groups possessed by (B) component | | | | 2.11 | 2.11 | 2.17 | 2.17 | 2.17 | 2.19 | 2.21 |

| | | | | Example 8 | Example 9 | Example 10 | Example 11 | Example 12 | Example 13 |
|---|---|---|---|---|---|---|---|---|---|
| Formulation (parts by weight) | (A) Monofunctional Monomer | (Meth)acrylate monomer of formula (1) or (2) | V#200 | 60 | 90 | 75 | 40 | 25 | 77 |
| | | | MEDOL-10 | — | — | — | — | — | — |
| | | Others | SR420 | — | — | — | — | — | — |
| | | | SR217 | — | — | — | — | — | — |
| | | | SR440 | — | — | — | 35 | 50 | — |
| | (B) Oligomer | | Ebe230 | 20 | 5 | — | 20 | 20 | 20 |
| | | | CN966J75 | — | — | 20 | — | — | — |
| | (C) Polyfunctional monomer | | TPGDA | 15 | — | — | — | — | — |
| | Photopolymerization Initiator | | TPO | 5 | 5 | 5 | 5 | 5 | 3 |
| Total molar fraction (%) of hydroxyl groups and amino groups possessed by (B) component | | | | 2.26 | 0.44 | 4.95 | 2.03 | 2.00 | 2.06 |

| | | | | Example 14 | Comparative Example 1 | Comparative Example 2 | Comparative Example 3 | Comparative Example 4 | Comparative Example 5 |
|---|---|---|---|---|---|---|---|---|---|
| Formulation (parts by weight) | (A) Monofunctional Monomer | (Meth)acrylate monomer of formula (1) or (2) | V#200 | 70 | —* | —* | 10* | 55 | 95* |
| | | | MEDOL-10 | — | —* | —* | — | — | — |
| | | Others | SR420 | — | 75 | — | 65 | — | — |
| | | | SR217 | — | — | 75 | — | — | — |
| | | | SR440 | — | — | — | — | — | — |
| | (B) Oligomer | | Ebe230 | 20 | 20 | 20 | 20 | 20 | 3* |
| | | | CN966J75 | — | — | — | — | — | — |
| | (C) Polyfunctional monomer | | TPGDA | — | — | — | — | 20* | — |
| | Photopolymerization Initiator | | TPO | 10 | 5 | 5 | 5 | 5 | 2 |
| Total molar fraction (%) of hydroxyl groups and amino groups possessed by (B) component | | | | 2.26 | 2.22 | 2.22 | 2.20 | 2.31 | 0.25 |

*means being out of the range defined in claim 1.

V #200: Cyclic trimethylolpropane formal acrylate (manufactured by Osaka Organic Chemical Industry Ltd.)

MEDOL-10: (2-methyl-2-ethyl-1,3-dioxolan-4-yl)methyl acrylate (manufactured by Osaka Organic Chemical Industry Ltd.)

SR420: 3,3,5-Trimethylcyclohexyl acrylate [manufactured by SARTOMER]

SR217: t-Butylcyclohexyl acrylate [manufactured by SARTOMER]

SR440: Isooctyl acrylate [manufactured by SARTOMER]

Ebe230: Urethane acrylate oligomer [Ebe230 (ethylenic double bond(s)/molecule: 2 bonds), Mw=5000, manufactured by DAICEL-ALLNEX LTD.]

CN966J75: Urethane acrylate oligomer [CN966J75 (ethylenic double bond(s)/molecule: 2 bonds), Mw=3000, hydrogen bonding component(s)/molecule: 4 components (urethane acrylate (75%) diluted with isobornyl acrylate (25%), manufactured by Arkema S.A.]

TPGDA: Tripropylene glycol diacrylate [SR306 (ethylenic double bond(s)/molecule: 2 bonds), manufactured by Arkema SA]

TPO: 2,4,6-Trimethylbenzoyl-diphenyl-phosphine oxide [DAROCURE TPO, manufactured by BASF SE]

(Measurement of Viscosity)

The viscosity of the resin compositions for model materials of Examples 1 to 14 and Comparative Examples 1 to 5 was measured under the conditions of 25° C. and a cone rotation number of 5 rpm using an R100-type viscometer (manufactured by TOM SANGYO CO., LTD.). The results are shown in Table 2.

(Sample Preparation)

A silicone rubber sheet (thickness: 3 mm, manufactured by AS ONE Corporation) was cut into a rectangle of 76 mm×52 mm, thereafter, from a central part of the rectangle, a rectangle of 56 mm×32 mm was cut out, and thereby, a rectangular frame was prepared. The rectangular frame was stuck on a glass plate of 56 mm×32 mm (S9224, manufactured by Matsunami Glass Ind., Ltd.) by pressure bonding, and thereby, a mold was prepared. Into a frame of the mold was poured 5.5 g of each of the resin compositions for model materials of Examples 1 to 14 and Comparative Examples 1 to 5, and was irradiated with ultraviolet rays using an ultraviolet ray irradiating apparatus (metal halide Lamp, irradiated light amount: 500 mJ/cm$^2$). Further, after thoroughly cooled to room temperature, a cured product was removed from the mold, and thereby, samples for assessment of Examples 1 to 14 and Comparative Examples 1 to 5 were prepared. Using the sample for assessment, the following assessments of bendability and surface tackiness were carried out.

(Assessment of Bendability)

Each of the samples for assessment of Examples 1 to 14 and Comparative Examples 1 to 5 was wound on a round bar of 5 mm in diameter. The bendability was assessed according to the following assessment criteria. Since the sample for assessment of Comparative Example 5 was impossible to maintain its shape, assessment of its bendability was not performed.

◯: When the sample was wound and then left to stand for 30 seconds or more, no cracks were generated.

Δ: No cracks were generated immediately after winding, but cracks were generated in 30 seconds after winding.

x: When the sample was wound, cracks were generated.

(Assessment of Surface Tackiness)

A finger was pushed against each of samples for assessment of Examples 1 to 14 and Comparative Examples 1 to 5, and the surface tackiness was assessed according to the following criteria.

○: There is no tacky feeling, and even when a finger is pushed thereagainst, a fingerprint trace remains little.

Δ: There is a slight tacky feeling, and when a finger is pushed thereagainst, a fingerprint trace remains.

x: There is a tacky feeling, and when a finger is pushed thereagainst, a finger trace remains.

[Assessment of Bleeding]

First, the resin compositions for model materials of Examples 1 to 14 and Comparative Examples 1 to 5 and a resin composition for a support material having the composition shown in below were dropped each in a volume of 0.02 mL on a film made of polyethylene terephthalate (A4300, manufactured by TOYOBO CO., LTD., 100 mm×150 mm×thickness 188 μm) using a micropipette. Thereupon, in the resin compositions for model materials and the resin composition for a support material, a distance between the central parts of the respective liquid droplets was 10 mm, and the respective liquid droplets were independent. Thereafter, respective liquid droplets were gradually wettedly spread, and respective liquid droplets were unified after about 10 seconds. Thereupon, the state of an interface of respective liquid droplets was observed visually from an upper side, and bleeding was assessed based on the following criteria. The results are shown in Table 2.

○: An interface between a layer of a resin composition for a model material and a layer of a resin composition for a support material were linear when viewed from the top, and no bleeding occurred.

Δ: At an interface between a layer of a resin composition for a model material and a layer of a resin composition for a support material, slight bleeding occurred.

x: At an interface between a layer of a resin composition for a model material and a layer of a resin composition for a support material, bleeding occurred.

The resin composition for a support material contained 25 parts by weight of ACMO, 45 parts by weight of PPG-1000, 21.6 parts by weight of MTG, 8 parts by weight of TPO, 0.1 parts by weight of TEGO-Rad 2100, and 0.3 parts by weight of H-TEMPO.

ACMO: Acryloylmorpholine [ACMO (ethylenic double bond(s)/molecule: 1 bond), manufactured by KJ Chemicals Corporation]

PPG-1000: Polypropylene glycol [UNIOL D1000 (molecular weight: 1000), manufactured by NOF CORPORATION]

MTG: Triethylene glycol monomethyl ether [MTG, manufactured by NIPPON NYUKAZAI CO., LTD.]

TEGO-Rad2100: Silicone acrylate having a polydimethylsiloxane structure [TEGO-Rad2100, manufactured by Evonik Degussa Japan Co., Ltd.]

TPO: 2,4,6-Trimethylbenzoyl-diphenyl-phosphine oxide [DAROCURE TPO, manufactured by BASF SE]

H-TEMPO: 4-Hydroxy-2,2,6,6-tetramethylpiperidine-N-oxyl [HYDROXY-TEMPO, manufactured by Evonik Degussa Japan Co., Ltd.]

TABLE 2

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Viscosity (mPa·s) | 106.2 | 52.0 | 56.6 | 40.4 | 58.4 | 38.2 | 105.0 | 107.8 | 22.3 | 94.1 | 37.3 |
| Bendability | ○ | ○ | ○ | ○ | ○ | ○ | ○ | ○ | ○ | ○ | ○ |
| Surface tackiness | ○ | ○ | ○ | ○ | ○ | ○ | ○ | ○ | Δ | ○ | ○ |
| Bleeding | ○ | ○ | ○ | ○ | ○ | Δ | ○ | ○ | ○ | ○ | ○ |

|  | Example 12 | Example 13 | Example 14 | Comparative Example 1 | Comparative Example 2 | Comparative Example 3 | Comparative Example 4 | Comparative Example 5 |
|---|---|---|---|---|---|---|---|---|
| Viscosity (mPa·s) | 26.4 | 99.3 | 141.2 | 33.7 | 35.1 | 39.7 | 106.9 | 15.7 |
| Bendability | ○ | ○ | ○ | Δ | Δ | Δ | X | — |
| Surface tackiness | Δ | ○ | ○ | ○ | ○ | X | ○ | X |
| Bleeding | ○ | ○ | ○ | X | X | X | ○ | ○ |

As seen from the results of Table 2, in the resin compositions for model materials of Examples 1 to 14 satisfying all of the requirements of the present invention and the cured products thereof, all of the assessments of viscosity, bendability, surface tackiness, and bleeding were good. That is, cured products of the resin compositions for model materials of Examples 1 to 14 have flexibility and do not crack even when they are bent.

On the other hand, the resin compositions for model materials of Comparative Examples 1 and 2 do not contain any (meth)acrylate monomer represented by the formula (1) or (2) as the monofunctional monomer (A). In the resin composition for a model material of Comparative Example 3, the content of the (meth)acrylate monomer represented by the formula (1) is less than 20 parts by weight. Therefore, in the samples for assessment of Comparative Examples 1 to 3, cracking did not occur immediately after winding, but cracking occurred 30 seconds after winding. In addition, bleeding occurred at the interface between the resin compositions for model materials of Comparative Examples 1 to 3 and the resin composition for a support material. Further, the sample for evaluation of Comparative Example 3 exhibited great surface tackiness.

In the resin composition for a model material of Comparative Example 4, the content of the polyfunctional monomer (C) exceeds 15 parts by weight. Therefore, in the sample for assessment of Comparative Example 4, cracking occurred when it was wound.

In the resin composition for a model material of Comparative Example 5, the content of the (meth)acrylate monomer represented by the formula (1) exceeds 90 parts by weight and the content of the polyfunctional oligomer is less than 5 parts by weight. Therefore, in the sample for assessment of Comparative Example 5, surface tackiness was too great to maintain its shape.

INDUSTRIAL APPLICABILITY

By photocuring the resin composition for a model material of the present invention, there can be obtained an optically shaped article that has flexibility and does not crack even when it is bent. Accordingly, these resin compositions can be suitably used in manufacturing an optically shaped article by an inkjet optical shaping method.

DESCRIPTION OF REFERENCE SIGNS

4a: Resin composition for model material
5a: Resin composition for support material
4: Model material
5: Support material

The invention claimed is:

1. A resin composition for a model material, which is used for shaping a model material by an inkjet optical shaping method and comprises a monofunctional monomer (A) and an oligomer (B) as photocurable components, wherein the resin composition comprises, based on 100 parts by weight of a whole resin composition, 20 to 90 parts by weight of a (meth)acrylate monomer represented by the following formula (1) as the (A) component, and 5 parts by weight or more of a polyfunctional oligomer as the (B) component, and further comprises no or 15 parts by weight or less, based on 100 parts by weight of the whole resin composition, of a polyfunctional monomer (C) as a photocurable component,

[Chemical Formula 1]

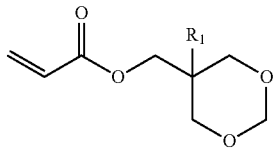

(1)

wherein $R_1$ represents a hydrogen atom or a linear or branched alkyl group having 1 to 3 carbon atoms, and
wherein the (B) component has a hydroxyl group or an amino group,
wherein a weight average molecular weight Mw of the oligomer (B) is 1,000 to 10,000, and
wherein a total molar fraction of the hydroxyl group and the amino group in a total amount of the photocurable components (A), (B) and (C) is less than 5.0%.

2. The resin composition for a model material according to claim 1, wherein the polyfunctional oligomer is one or more species selected from the group consisting of a urethane (meth)acrylate oligomer, an epoxy (meth)acrylate oligomer, and a polyester (meth)acrylate oligomer.

3. The resin composition for a model material according to claim 1, wherein a content of the (meth)acrylate monomer represented by the formula (1) is 25 parts by weight or more based on 100 parts by weight of the whole resin composition.

4. A model material comprising a cured product of the resin composition according to claim 1.

5. A method for manufacturing optically shaped articles by an inkjet optical shaping method, the method comprising:
a step (I) of photocuring the resin composition for a model material according to claim 1 to obtain a model material and, at the same time, photocuring a resin composition for a support material to obtain a support material; and
a step (II) of removing the support material.

6. The resin composition for a model material according to claim 1, wherein the weight average molecular weight Mw of the oligomer (B) is 3,000 to 10,000.

* * * * *

UNITED STATES PATENT AND TRADEMARK OFFICE
CERTIFICATE OF CORRECTION

| | | |
|---|---|---|
| PATENT NO. | : 11,713,366 B2 | Page 1 of 1 |
| APPLICATION NO. | : 16/311578 | |
| DATED | : August 1, 2023 | |
| INVENTOR(S) | : Katsuyuki Kito et al. | |

It is certified that error appears in the above-identified patent and that said Letters Patent is hereby corrected as shown below:

On the Title Page

Under item (73) "Assignee", please add a second additional assignee:
-- MIMAKI ENGINEERING CO., LTD., Nagano (JP) --

Signed and Sealed this
Fifth Day of March, 2024

Katherine Kelly Vidal
*Director of the United States Patent and Trademark Office*